United States Patent [19]

Yamada

[11] Patent Number: 5,021,930
[45] Date of Patent: Jun. 4, 1991

[54] AUTOMOTIVE HEADLAMP HAVING REDUCED CHROMATIC ABERRATION

[75] Inventor: Masaru Yamada, Shizuoka, Japan
[73] Assignee: Koito Manufacturing Co., Ltd., Tokyo, Japan
[21] Appl. No.: 580,746
[22] Filed: Sep. 11, 1990
[30] Foreign Application Priority Data
Dec. 28, 1989 [JP] Japan .................................. 1-338384
[51] Int. Cl.⁵ ............................................ B60Q 1/00
[52] U.S. Cl. .................................... 362/61; 362/268; 362/305
[58] Field of Search ................... 362/61, 80, 268, 304, 362/305, 310, 308, 307, 329

[56] References Cited
U.S. PATENT DOCUMENTS

| | | | |
|---|---|---|---|
| 3,578,966 | 5/1971 | Levin | 362/329 X |
| 4,914,747 | 4/1990 | Nino | 362/61 |
| 4,928,213 | 5/1990 | Nakata | 362/61 |
| 4,953,063 | 8/1990 | Nino | 362/61 |

*Primary Examiner*—Stephen F. Husar
*Attorney, Agent, or Firm*—Sughrue, Mion, Zinn, Macpeak & Seas

[57] ABSTRACT

The present invention relates to an automotive headlamp construction in which chromatic aberation is substantially eliminated. The headlamp includes an elliptic reflector, a light source disposed at a first focal point of the elliptic reflector, a condenser lens which is focused generally at a second focal point of the elliptic reflector, and an outer lens provided in front of the condenser lens. In accordance with the invention, the radius of curvature of the outer lens is reduced at a vertically middle portion thereof to form an angled portion through which light from the light source passes. The angled portion acts as a lens having a focal length such that chromatic aberration of the condenser lens is canceled out.

1 Claim, 9 Drawing Sheets

AUTOMOTIVE HEADLAMP HAVING REDUCED CHROMATIC ABERRATION

BACKGROUND OF THE INVENTION

The present invention relates to an automotive headlamp construction in which chromatic aberration is substantially eliminated.

An automotive headlamp converts light from a light source (bulb) into parallel rays so as to illuminate the road in front of the vehicle. Headlamps may be divided into two types: one in which the light from the light source is converted into generally parallel rays by a parabolic reflector, and another in which the light from the light source is converted into parallel rays by the combination of an elliptic reflector and a condenser lens.

The condenser lens used in the latter type tends to develop chromatic aberration since the rays incident upon a portion remote from the optical axis of the lens are subjected to higher refractive indices than in other areas. This chromatic aberration arises due to the fact that the light from the light source includes a variety of wavelengths (colors) for which the refractive index differs slightly. This in turn results in slightly different focal lengths of the lens for the different colors.

There have been a variety of conventional headlamps free from chromatic aberration, including a type in which a shade for diffusing light is disposed near the focal point of the reflector (Japanese Published Patent Application No. 53-23180) and a type in which a member for causing the light to refract or diffuse is directly fixed onto the surface of a condenser lens through an adhesive (Japanese Patent Preliminary Publication No. 60-62001).

However, these headlamps require the provision of, for example, a shade (mask) for diffusing and refracting the light to eliminate chromatic aberration, which shade must be specially worked or a powerful light source provided for overcoming the decrease in light transmissivity resulting from the members fixed to the condenser lens.

SUMMARY OF THE INVENTION

The present invention was made to overcome the above-described drawbacks. Thus, an object of the invention is to provide a vehicular headlamp in which chromatic aberration is substantially eliminated without reducing the light transmissivity and without requiring special working of the shade which shields light unnecessary for forming the required light distribution pattern.

In accordance with the above and other objects, the invention provides an automotive lighting apparatus comprising an elliptic reflector, a light source disposed at a first focal point of the elliptic reflector, a condenser lens which is focused substantially at a second focal point of the elliptic reflector, and an outer lens provided in front of the condenser lens, wherein the radius of curvature of the outer lens is reduced at a vertically middle portion thereof to form an angled portion, the angled portion serving as a lens having a focal length such that chromatic aberration of the condenser lens is canceled out, and the outer lens is positioned so that light from the light source passes through the angled middle portion.

Because the angled portion of the outer lens cancels out the chromatic aberration of the condenser lens, the necessity of working the shades is eliminated.

DESCRIPTION OF THE PREFERRED EMBODIMENTS

Preferred embodiments of the present invention will now be described with reference to the drawings.

FIGS. 1-17 show an example of an automotive lighting apparatus mounted on the left side of the vehicle (left side seen from the driver seat) constructed according to the present invention.

Figure 1:
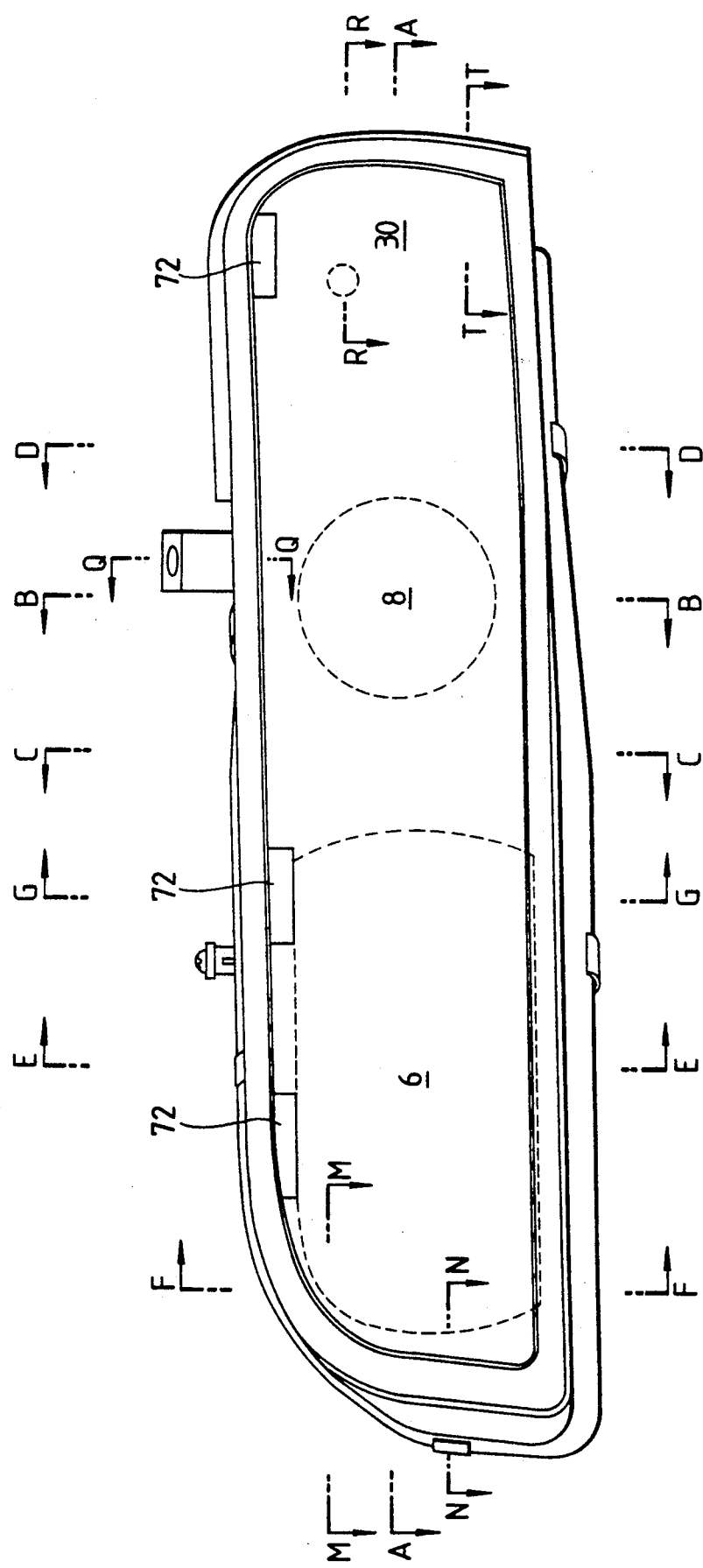
FIG. 1 is a front view showing a preferred embodiment of a headlamp device of the invention.
Figure 2:
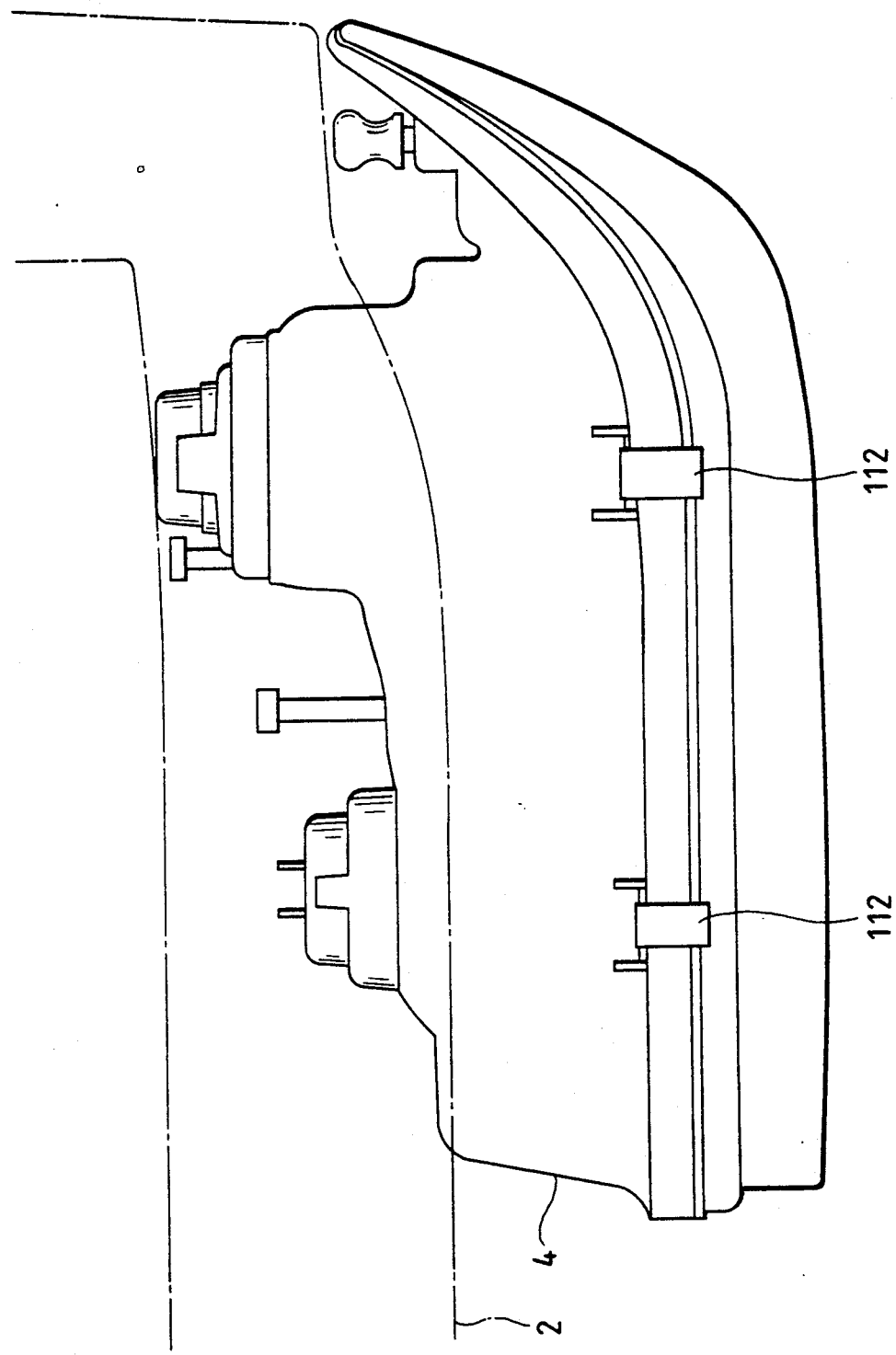
FIG. 2 is a top view of the headlamp of FIG. 1.
Figure 3:
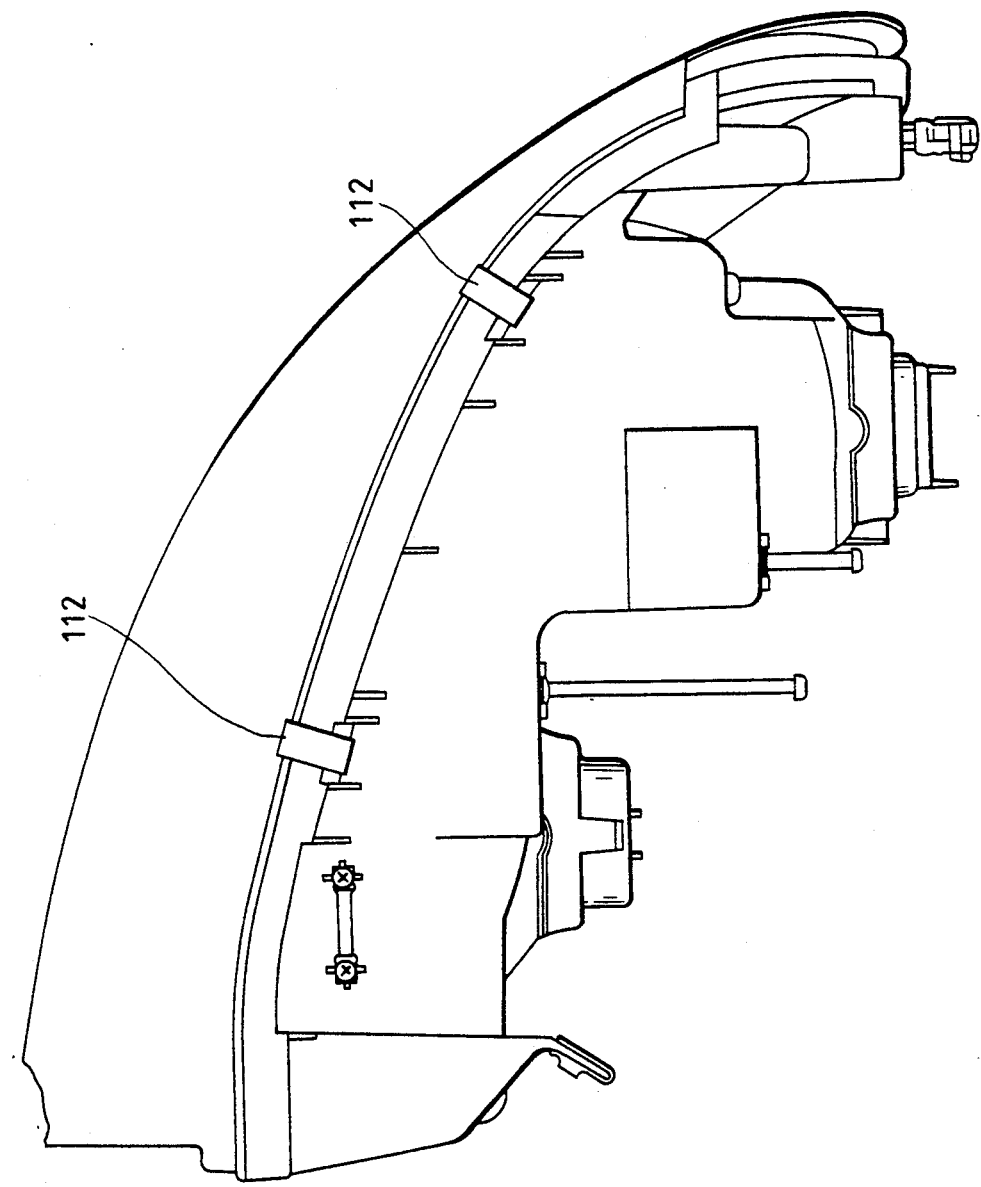
FIG. 3 is a bottom view of the headlamp of FIG. 1.
Figure 4:
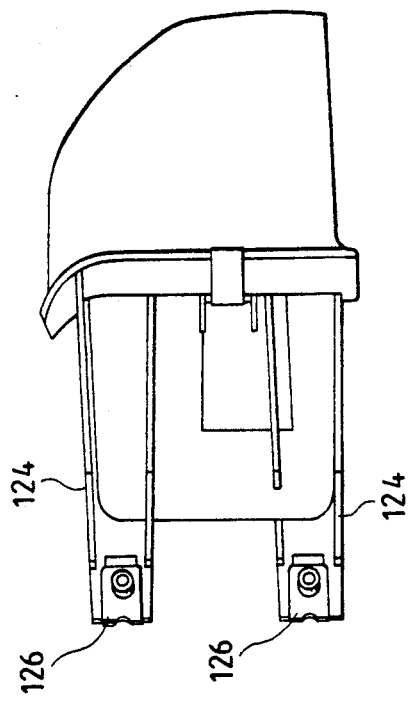
FIG. 4 is a side view of the vehicle in FIG. 1.
Figure 5:
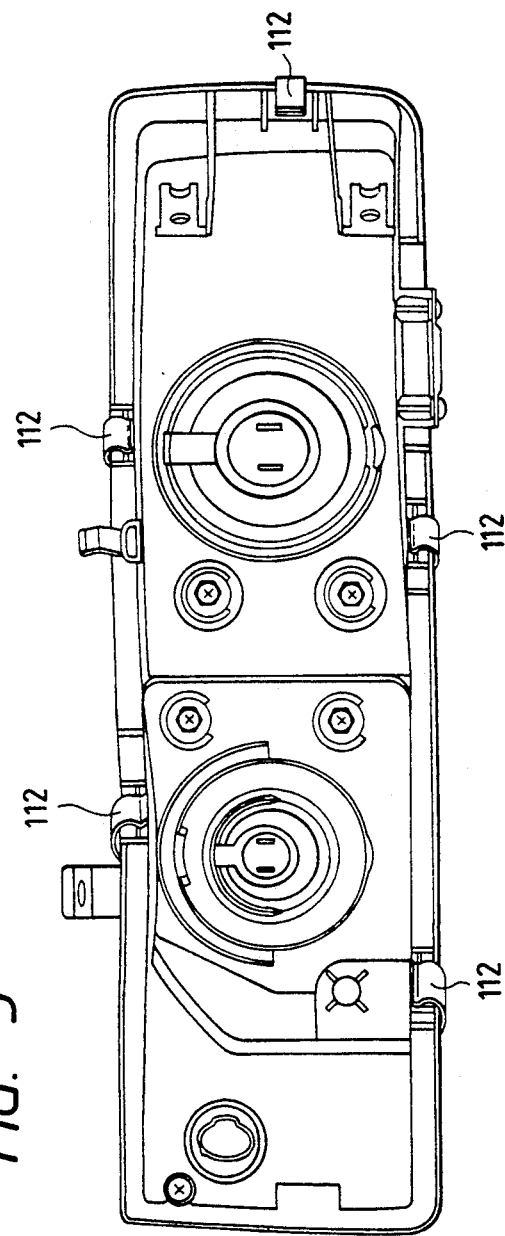
FIG. 5 is a rear view of the headlamp of FIG. 1.
Figure 6:
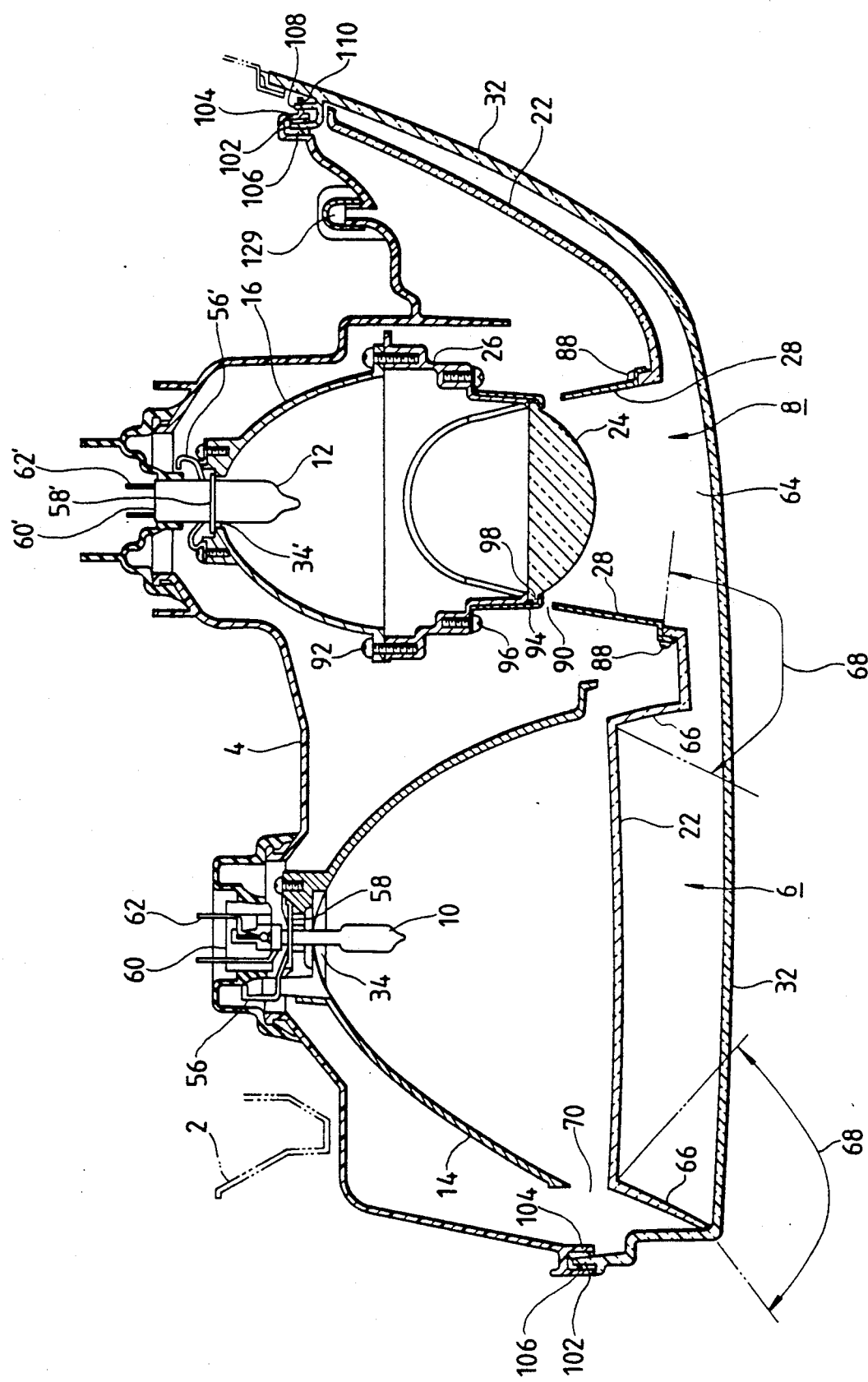
FIG. 6 is a horizontal cross-sectional view taken along the line A—A in FIG. 1.
Figure 7:
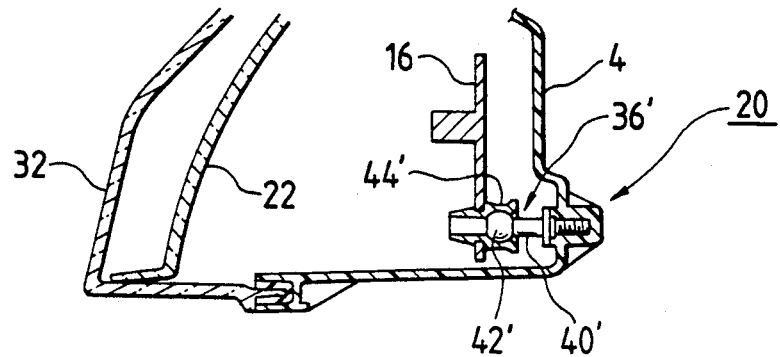
FIG. 7 is a cross-sectional view taken along the line D—D in FIG. 1.

A high beam lamp 6 and a low beam lamp 8 are provided within a lamp body 4 which is mounted on an automobile body 2 (FIG. 6). The lamps 6 and 8 have reflectors 14 and 16, respectively, which reflect light from bulbs 10 and 12, respectively. The reflectors 14 and 16 are mounted on the lamp body 4 through respective aiming mechanisms 18 and 20 so that they can be rotated through small angles so as to adjust the positions thereof. The reflected light beams are projected toward the area to be illuminated through an inner lens 22 and a condenser lens 24. The light from the low beam lamp 8 is partially shielded by a shade 17 which cuts a part of the light not required for forming the required light projection patterns, and the remaining light is transmitted through the condenser lens 24. The condenser lens 24 is integrally mounted on an elliptic reflector 16 through a holder 26. A protector 28 is mounted on the inner lens 22 in front of the condenser lens 24 so as to protect the side portions thereof against heat radiated from the condenser lens 24. The inner lens 22 extends not only in front of the high beam lamp 6 but also in front of a clearance lamp 30 located at a side end portion of the lamp.

The outer lens 32 is provided in front of the inner lens 33 and condenser lens 24. The outer lens 22 is preferably continuous in shape with the outer surface of the automobile body.

Reflector

Figure 8:
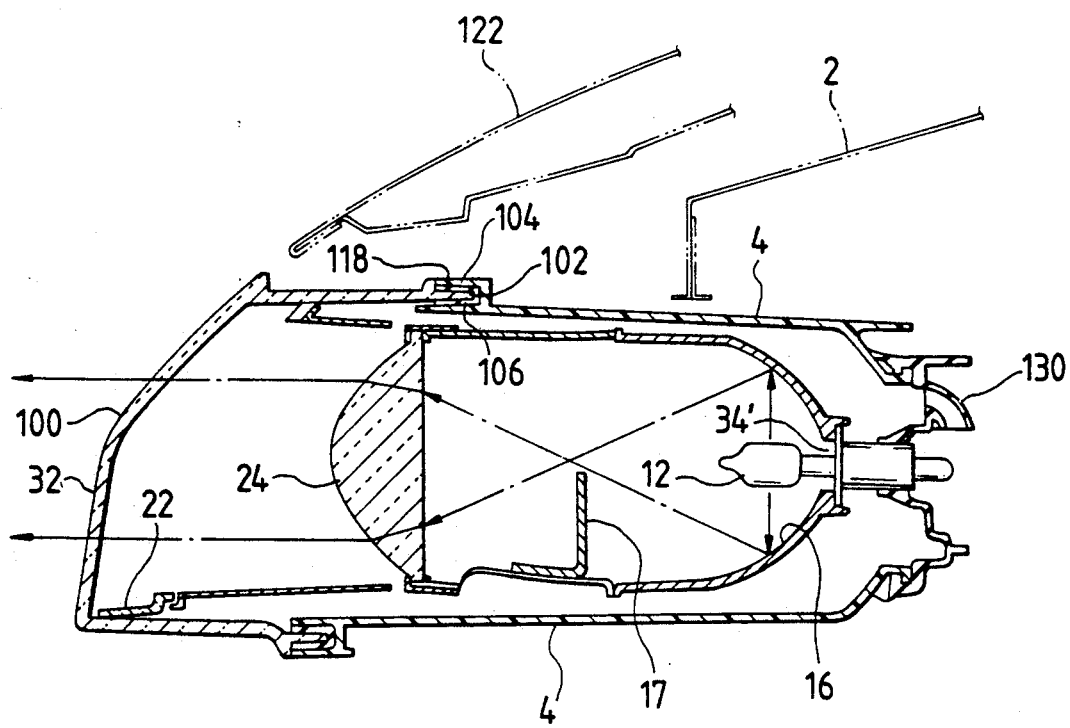
FIG. 8 is a cross-sectional view taken along the line B—B in FIG. 1.
Figure 9:
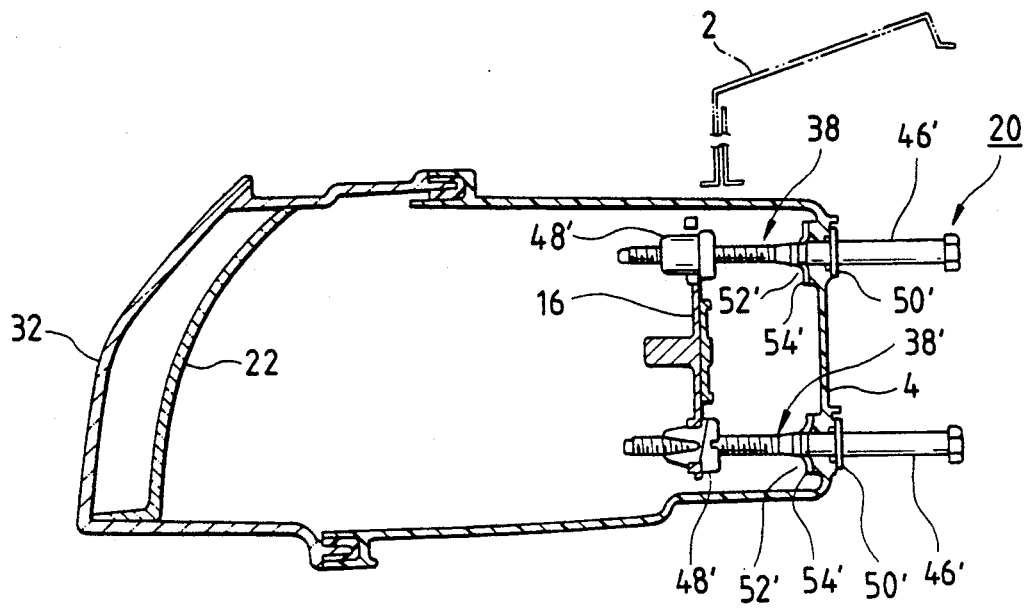
FIG. 9 is a cross-sectional view taken along the line C—C in FIG. 1.
Figure 10:
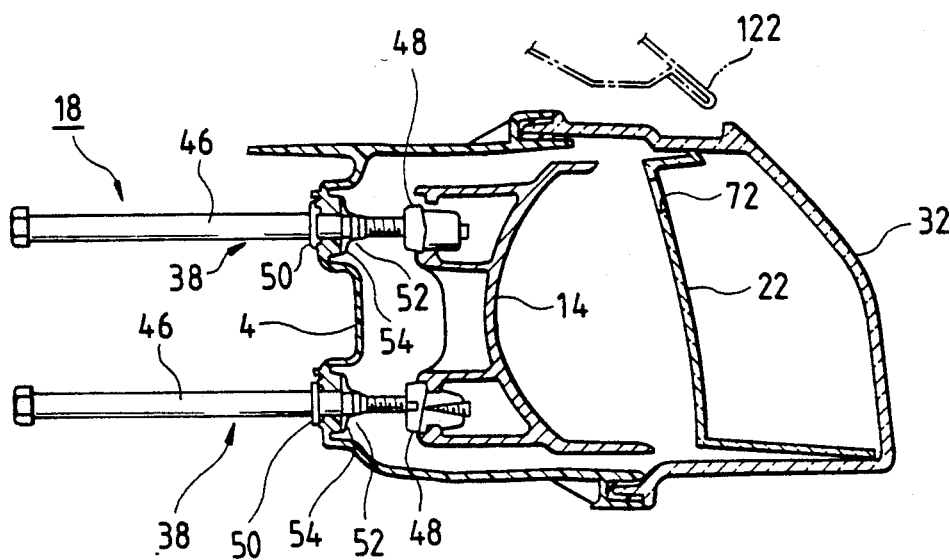
FIG. 10 is a cross-sectional view taken along the line G—G in FIG. 1.

The reflector 14 of the high beam lamp 6 is in the form of a parabolic reflector 14 (FIG. 11), while the reflector 16 of the low beam lamp 8 is in the form of an elliptic reflector (FIG. 8). The respective reflectors 14 and 16 are formed with bulb insertion holes 34 and 34' in the middle portions thereof for receiving lamp bulbs 10 and 12. The shade 17 is provided in front of the reflector 16 for shielding part of the light from the lamp bulb 12 so as to form the required lighting pattern. The reflectors 14 and 16 are mounted on the lamp body 4 by means of aiming mechanisms 18 and 20. Each aiming mechanism 18 (20) (FIGS. 7, 9, 10, and 12) is formed of a fulcrum 36 (36') which holds the reflector such that the reflector can be rotated in all directions, and two adjustment supports 38 and 38 (38' and 38'). These three members support the reflector 14 (16).

The fulcrum 36 (36') (FIGS. 7 and 12) is formed of a sphere 42 (42') formed on the tip end of a bar-like pivot 40 (40') provided on the side of the lamp body 4 and pivot joint 44 (44'). The fulcrums 36 and 36, serve as a fulcrum when the reflectors 14 and 16 are varied in positions. The adjustment support 38 (38') (FIGS. 9 and 10) is formed of a rotatable adjusting screw 46 (46') extending through the lamp body 4 and a self-locking nut 48 (48') fixed to the reflector 14 (16) and into which the tip end portion of the adjusting screw 46 (46') is screwed. The adjusting screw 46 (46') is formed with a flange 50 (50') with a groove therein. The flange 50 (50') abuts the rear side of the lamp body 4, and a fastener 54 (54') pressed into the groove 50 (50') abuts the inner side of the lamp body 4 so as to hold the lamp body 4 in sandwiched relation.

With this construction, when the adjusting screw 46 is rotated, the adjusting screw 46 (46') is restrained in its axial movement relative to the lamp body 4. The self-locking nut 48 (48') mounted on the side of the reflector 14 (16) is thus displaced in the axial direction of the adjusting screw by the rotation of the adjusting screw 46 (46') screwed into the nut 48 (48'). Individually adjusting the adjusting screws 46 and 46' enables adjustment of the position of the reflector 16 in both the vertical and horizontal planes.

Lamp Bulbs

Bulb lamps 10 and 12 are inserted into the bulb insertion holes 34 and 34', respectively, in the reflectors 14 and 16 from the rear sides of the reflectors 14 and 16 (FIG. 6, 8, 11). The lamp bulbs are mounted by means of respective set springs 56 and 56'. The set spring 56 (56') is depressed to deflect at one end thereof against the edge portion of the bulb insertion hole 34 (34'), and is clamped to a clamping portion provided at the other edge portion of the bulb insertion hole, thereby fastening the set spring 56 (56') in position. By this construction, the middle portion of the set spring 56 (56') presses the flange 58 (58') of the lamp bulb 10 (12) from the rear of the flange against the edge portion of the bulb insertion hole 34 (34') for securely mounting the lamp bulb 10 (12). A lamp bulb 10 (12) is provided behind the flange 48 (48') with a base 60 (60') having a terminal 62 (62') thereon through which electric power is supplied to the bulb 10 (12) to light the filament in the lamp bulb 10 (12).

Inner Lens

Figure 13:
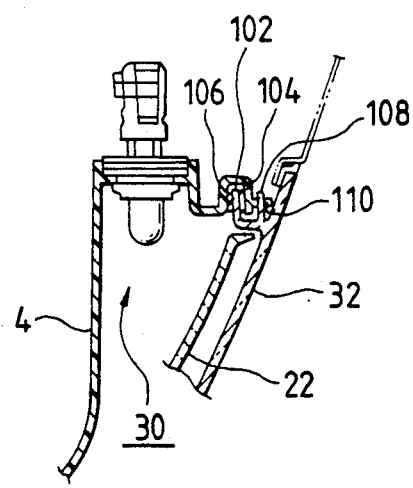
FIG. 13 is a cross-sectional view taken along the line R—R in FIG. 1.

The inner lens 22 is provided over the opening sides of the reflectors 14 and 16 with respect to the high beam lamp 6 (FIGS. 6 and 11) and clearance lamp 30 (FIG. 13). The inner lens 22 is of a one-piece structure and is formed of light-conductive polycarbonate resin. A hole 64 is formed therein at a portion opposing the low beam lamp 8 so as to permit mounting of the protector 28. A hood 60, which is a decorative frame, is integral with the outer edge of the inner lens 22 on the side of the high beam lamp 6. A grey light-shielding paint 68 is applied to the hood 60. The one-piece structure of the inner lens 22 and the hood 66 reduces the number of parts, which in turn reduces the number of assembly steps. Further, the one-piece structure presents a clearance from developing between the hood 66 and the inner lens 22, thus providing the structure with a good appearance seen from the front side of the headlamp, as opposed to the case where the inner lens and hood are formed as separate members, as in the conventional case. The absence of the clearance between the inner lens 22 and the hood 60 also serves to effectively put the aiming clearance between the reflector 14 and the inner lens 22 out of visible sight. Further, the absence of the clearance between the inner lens and hood prevents the leakage of light therethrough.

The inner lens 22 is formed with an air path 72 (FIGS. 1 and 10) in its upper portion for preventing the lens from fogging by allowing air trapped in the space between the inner lens 22 and the outer lens 32 to circulate through the air path 72 into the lamp body 4. This air circulation causes the convection of air to thereby prevent both the inner lens 22 and the outer lens 32 from fogging. Moreover, the circulation of air reduces the temperature difference between the spaces partitioned by the inner lens, which prevents thermal deformation of the inner lens 22.

Figure 16:
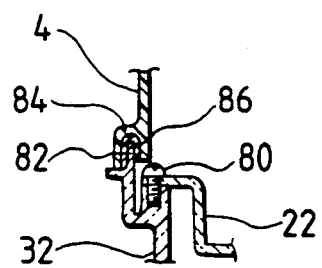
FIG. 16 is a cross-sectional view taken along the line N—N in FIG. 1.
Figure 17:
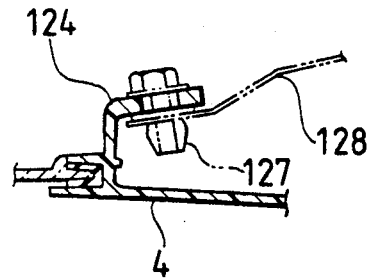
FIG. 17 is a cross-sectional view taken along the line Q—Q in FIG. 1.

To secure the inner lens 22 is mounted to the lamp body 4, as shown in FIG. 16, the inner lens 22 is secured to the outer lens 32 by means of a bolt 80, and a seal leg 76 provided at the edge portion of the inner lens 22 is fitted into a seal groove 74 formed in the lamp body 4 using a sealing agent 78. At the same time, a seal leg 82 formed at the edge portion of the outer lens 32 is also fitted into a seal groove 84 formed in the lamp body 4 using a sealing agent 86. In this manner, the inner lens 22 is assembled to the outer lens 32 in such a manner as to improve the efficiency of the assembly work.

Protector

A protector 28 is fitted into the hole 64 (FIG. 6) formed in the middle of the inner lens 22, and is mounted to the inner lens 22 by means of a bolt 88 from inside the inner lens. The protector 28, which is die-cast of aluminum, encloses the space between the condenser lens, the lamp body, and the outer lens to shield the surrounding area from heat radiated from the condenser lens 24. Being made of aluminum, the protector 28 radiates the heat inside the space defined by the condenser lens, the protector, and the outer lens to the outside of the space so as to lower the temperature in the space, thus protecting the protector 28 itself as well as the outer lens 32 from thermal deformation. The protector may also be made of a metal other than aluminum and be produced by forming a metal plate into a cylinder. The protector 28, which preferably takes the form of a circular cone obliquely truncated at the top and bottom thereof, provides at its free end a clearance 90 with respect to the condenser lens 24 to permit aiming of the low beam lamp 8 to be carried out. The air between the outer lens 32 and the condenser lens 24 is allowed to circulate through the clearance 90 into the space within the lamp body 4.

Holder

A holder 26 is mounted by means of a bolt 92 to the front edge portion of the elliptic reflector 16 for the low beam lamp 8. The holder 26 is die-cast of aluminum and is used for mounting the condenser lens 24. The holder 26 is generally of a cylindrical shape and a mounting angle 94, termed a lens fitting, is attached to the front end portion of the holder 26 by means of a bolt 96. The mounting angle 94 has a bent portion having an L-shaped cross section such that the tip portion retains the front surface of the flange 98 formed around the outer circumference of the condenser lens 24. Thus, the reflector 16, the shade 17, the holder 26, the mounting angle 94, and the condenser lens 24 are assembled in a unitary construction.

Outer Lens

The outer lens 32, which is a one-piece molded member made of transparent polycarbonate resin, covers the inner lens 22 and the condenser lens 24. The longitudinal cross section (FIGS. 7-11) of the outer lens 32 does not have a constant radius of curvature at its front side, but a small radius of curvature at an angled portion midway in the vertical direction of the lens 32. The angled portion 100 is located opposing the condenser lens 24 (FIG. 8). The angled portion 100 functions as a lens by virtue of the bent shape thereof so as to cancel out the chromatic aberration of the condenser lens 24. The chromatic aberration of the condenser lens 24 arises due to the fact that the condenser lens 24 has a spherical surface which exhibits slightly different refractive indices for different colors of light, that is, light of slightly different wavelengths emitted from the lamp bulb 12, which thus results in slightly different focal lengths. Therefore, light which would otherwise be white becomes rather bluish. The angled portion 100 of the present embodiment serves as a lens to cause chromatic aberration reverse of that of the condenser lens 24, thereby canceling out the chromatic aberration of the condenser lens to bring the bluish light back to the white light.

The principle by which the chromatic aberration of the condenser lens is canceled out by that of the outer lens to substantially eliminate chromatic aberration in the output light beam will now be described mathematically:

From a point of view of geometrical optics, the focal length f of a lens is given by:

$$1/f = (n-1)(1/r_1 - 1/r_2) \qquad (1)$$

where n is the refractive index of the lens, and $r_1$ and $r_2$ are the radii of curvature of the two surfaces of the lens.

The difference $\Delta n$ in refractive index between two wavelengths is given by:

$$n = n(\lambda_1) - n(\lambda_2)$$
$$= (\tfrac{1}{2})(n(\lambda_1) + -n(\lambda_2))$$

where $\lambda_1$ and $\lambda_2$ are two respective wavelengths, and $n(\lambda_1)$ and $n(\lambda_2)$ are the refractive indices for the respective wavelengths.

From Equation (1), the following relation is obtained:

$$\Delta f/f = -n/(n-1) \qquad (2)$$

where $\Delta f$ is the difference in focal length between the wavelengths $\lambda_1$ and $\lambda_2$. Here, $v$, defined by $-(n-1)/\Delta n \equiv V > 0$, is referred to as the "dispersive power". Using the dispersive power $v$, Equation (2) can be reduced to:

$$\Delta f/f = f/v \qquad (3)$$

The resulting focal length f when two lenses are spaced apart by a distance $\delta$ is geometrically given by:

$$1/f = 1/f_0 + 1/f_1 - \delta/f_0 f_1 \qquad (4)$$

where $f_0$ and $f_1$ are the focal lengths of the two respective lenses.

By differentiating the left and right sides of the above Equation (4), the following relation is obtained in combination with Equation (3):

$$\Delta f/f^2 = 1/f_0 v_0 (1 - \delta/f_1) + 1/f_1 v_1 (1 - \delta/f_0) \qquad (5)$$

where $v_0$ and $v_1$ are the dispersive powers of the two lenses.

The achromatic condition is f=0, and thus the following is obtained from Equation (5):

$$f_0 v_0 + f_1 v_1 = (v_0 + v_1)\delta \qquad (6)$$

By solving Equation (4) and (6), an achromatic lens having a required focal length f can be obtained.

If the two lenses are of the same type, $v_1 = v_0$, and Equation (6) can be rewritten as follows:

$$f_0 + f_1 = 2\delta \qquad (7)$$

Applying Equation (7) to the condenser lens 24 and the outer lens 32 of the above embodiment, the focal length f of the outer lens 32 is obtained, where $f_0$ is the focal length of the condenser lens 24 and $\delta$ is the distance between the condenser lens 24 and the outer lens 32.

Thus, setting the focal length of the outer lens 32 to $f_1$ in Equation (7) causes the cancellation of the chromatic aberrations of the condenser lens 24 and the outer lens 32, eliminating the total chromatic aberration.

Figure 14:
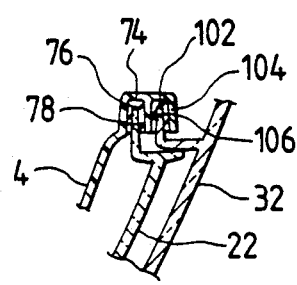
FIG. 14 is a cross-sectional view taken along the line T—T in FIG. 1.
Figure 15:
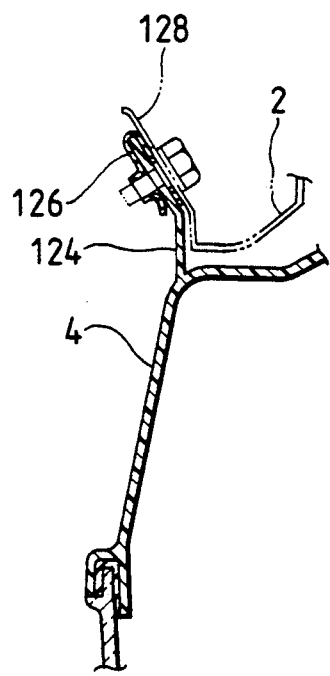
FIG. 15 is a cross-sectional view taken along the line M—M in FIG. 1.

The outer lens 32 is formed with a seal leg 102 continuously integral with the outer periphery of the outer lens. The seal leg 102 engages a seal groove 104 formed at the outer periphery of the lamp body 4 by means of a sealing agent 106 to thereby assemble the outer lens 32 to the lamp body 4 (FIGS. 6 and 14). The outer lens 32 is formed with a pin 108 extending parallel to and continuously integral with the seal leg 102, while the lamp body 4 is formed with a pin hole therein into which the pin 108 is inserted. Accordingly, accurate assembly work may be performed at the corner portion of the automobile body around which the outer lens slowly curves into a narrow shape.

A projection 110, in which the pin hole is provided, is formed on the outer side portion of the seal groove 104. During assembly, the seal leg 102 is inserted into the seal groove 104 while at the same time the pin 108 is inserted into the pin hole. In general, the seal groove 104 loosely engages the seal leg 102 with some clearance therebetween into which sealing agent is filled. The sealing agent 106 tends to soften at high temperatures, disturbing the positioning of the seal leg in a direction transverse to the seal leg 103. Moreover, the outer lens 32 is thin and curved at the side end portion thereof, so that the outer lens can easily deflect so as to be displaced relative to the vehicle body in a direction transverse to the longitudinal axis of the vehicle. Thus, in the present embodiment, the pin 108 engages the pin hole to facilitate the relative positioning between the seal groove 104 and the seal leg 102 in the direction transverse to the longitudinal direction of the vehicle, which has been difficult in the conventional apparatus.

Figure 11:
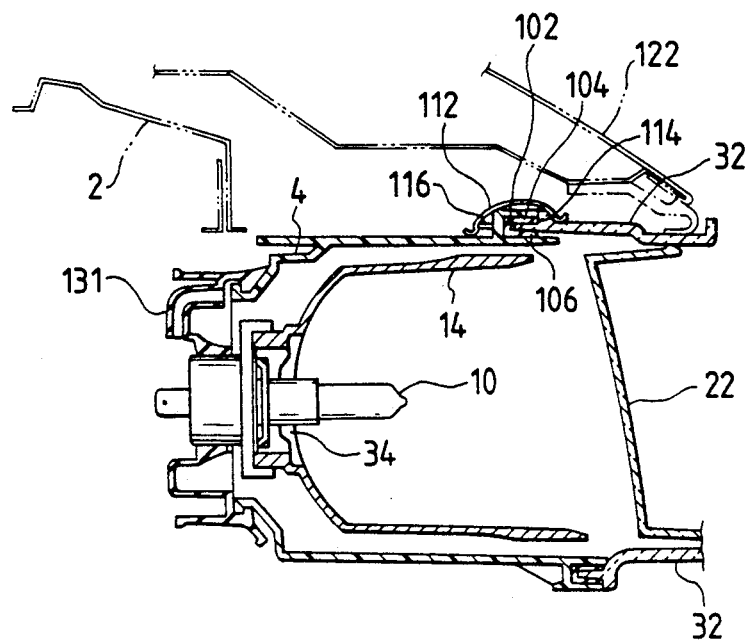
FIG. 11 is a cross-sectional view taken along the line E—E in FIG. 1.
Figure 12:
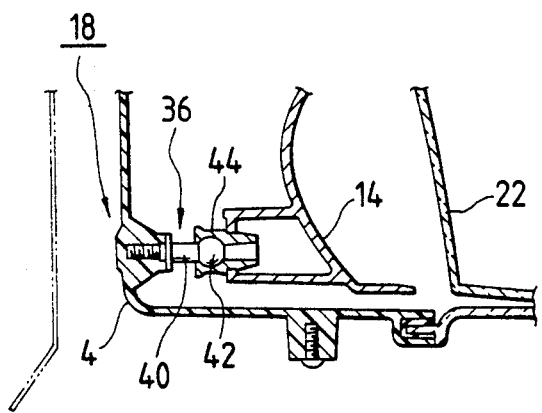
FIG. 12 is a cross-sectional view taken along the line F—F in FIG. 1.

After the assembly of the headlamp has been completed, curved plate-like spring members, namely, clips 112 are provided at five locations around the head lamp where the outer lens 32 meets the lamp body 4 to grip both a projection 114 on the outer lens 32 and a projection 116 on the lamp body 4 such that the two projections are biased toward each other (FIG. 11). This gripping action presses the seal leg 102 into the seal groove 104 but does not contribute to positioning the seal leg 102 in the seal groove in the direction transverse to the longitudinal direction of the vehicle. In other words, the outer lens 32 may be displaced from the lamp body 4 by the thickness of the sealing agent 106 between the seal 102 and seal groove 104. In the present embodiment, the pin 108 is inserted into the pin hole in the projection 110 to thereby prevent the displacement of the outer lens 32 in the thickness direction thereof. Providing the pin 108 and the pin hole at the headlamp side portion, where the displacement tends to be developed in the prior art, eliminates the aforementioned displacement and unnecessary play as well as prevents the gap between the outer lens 32 and lamp body 4.

Lamp Body

As mentioned previously, the outer lens 32 is engaged with the lamp body 4 by inserting the seal leg 102 on the outer lens 32 into the seal groove 104. The seal groove 104 is provided to project outwardly from the wall of the lamp body 4, as depicted in cross section in FIG. 8. Reference numeral 122 denotes a bonnet. The lamp body 4 is provided with a vent 129, as shown in FIG. 6, at the rear side thereof for air circulation between the inside and outside of the lamp camber, thereby preventing fogging of the lens due to a temperature difference between the inside and outside of the lamp chamber.

Communication holes 130 and 131 for a similar purpose are shown in FIGS. 8 and 11.

A clamp is mounted to the lamp body by means of, for example, a bolt, so that the lamp body 4 is mounted to the car body through a projection provided thereon which engages this clamp. For further secure mounting, the lamp body 4 is integrally formed with a mounting arm 124 at the longitudinal middle portion and transverse edge portion thereof (FIGS. 4, 15, and 17) extending rearwardly of the vehicle. The tip end portion of the mounting arm 124 is mounted to a bracket 128 on the automobile body by passing through a bolt secured through the use of a spring nut 126 and a fastener 127.

As described above, according to the present invention, an angled portion with a small radius of curvature provided in the generally vertical middle portion of the outer lens functions as a lens having a focal length which cancels out the chromatic aberration of the condenser lens. Therefore, the outer lens alone is enough to cancel the chromatic aberration of the condenser lens without increasing the total number of parts, as opposed to the prior art approach where a worked shade is necessary.

What is claimed is:

1. An automotive headlamp comprising:
   an elliptical reflector;
   a light source located at a first focal point of said elliptical reflector;
   a condenser lens focused substantially at a second focal point of said elliptical reflector;
   a shade provided in front of said reflector for shielding part of light from said light source; and
   an outer lens provided in front of said condenser lens, said outer lens having an angled portion extending along a vertically middle portion thereof having a radius of curvature smaller than in other portions of said outer lens, said outer lens being positioned such that light from said light source passes through said angled portion.

* * * * *